(12) United States Patent
Lee et al.

(10) Patent No.: US 11,544,255 B2
(45) Date of Patent: Jan. 3, 2023

(54) BLOCKCHAIN DATA RECORDING METHOD AND APPARATUS THEREOF

(71) Applicant: SAMSUNG SDS CO., LTD., Seoul (KR)

(72) Inventors: Kyu Sang Lee, Seoul (KR); Young Yoo Heo, Seoul (KR); Kwang Cheol Lee, Seoul (KR); Sang Ji Bae, Seoul (KR); Jun Tae Kim, Seoul (KR); Jung Eun Lee, Seoul (KR); Kyung Jin Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 303 days.

(21) Appl. No.: 17/063,963

(22) Filed: Oct. 6, 2020

(65) Prior Publication Data

US 2021/0357387 A1    Nov. 18, 2021

(30) Foreign Application Priority Data

May 14, 2020    (KR) ................ 10-2020-0057842

(51) Int. Cl.
*G06F 21/00*    (2013.01)
*G06F 16/23*    (2019.01)
*G06F 16/25*    (2019.01)
*H04L 9/32*    (2006.01)
*G06Q 10/10*   (2012.01)
*H04L 9/00*    (2022.01)

(52) U.S. Cl.
CPC ........ *G06F 16/2379* (2019.01); *G06F 16/258* (2019.01); *H04L 9/3239* (2013.01); *G06Q 10/10* (2013.01); *H04L 9/50* (2022.05)

(58) Field of Classification Search
CPC .............. G06F 16/2379; G06F 16/258; G06F 16/1837; G06F 16/27; G06F 21/64; H04L 9/3239; H04L 9/50; H04L 67/1097; G06Q 10/10; G06Q 20/38
See application file for complete search history.

(56) References Cited

U.S. PATENT DOCUMENTS

| | | | |
|---|---|---|---|
| 2019/0342084 A1 | 11/2019 | Mehedy et al. | |
| 2020/0396089 A1* | 12/2020 | Guo | H04L 9/0637 |
| 2021/0081216 A1* | 3/2021 | Komarov | G06F 9/44505 |
| 2021/0184834 A1* | 6/2021 | DeValve | H04L 9/3297 |
| 2021/0357387 A1* | 11/2021 | Lee | H04L 9/3239 |

* cited by examiner

*Primary Examiner* — Mahfuzur Rahman
(74) *Attorney, Agent, or Firm* — The PL Law Group, PLLC (57) ABSTRACT

A blockchain data recording method includes determining a recording type as one of an on-chain type and an off-chain type according to a target data to be recorded in a blockchain, transmitting a first transaction proposal for recording the target data in a blockchain node configured to store an on-chain data on a blockchain to the blockchain node when the recording type is an on-chain type, and recording the target data in a storage node provided to store an off-chain data, and transmitting a second transaction proposal for storing recording information of the target data in the blockchain to the blockchain node when the recording type is an off-chain type.

19 Claims, 8 Drawing Sheets

BLOCKCHAIN DATA RECORDING METHOD AND APPARATUS THEREOF

CROSS-REFERENCE TO RELATED APPLICATIONS

This patent application claims the benefit of Korean Patent Application No. 10-2020-0057842, filed on May 14, 2020, which is hereby incorporated by reference in its entirety into this application.

FIELD

The present invention relates to a method and apparatus for recording blockchain data. More specifically, it relates to a method for improving the speed of recording blockchain data according to characteristics of target data to be recorded in the blockchain and an apparatus, to which the method is applied.

DESCRIPTION OF THE RELATED ART

Blockchain is a data management technology, in which continuously increasing data are recorded in blocks of a specific unit and each blockchain node constitutes a peer-to-peer network that manages blocks as a data structure in the form of a chain. Blockchain can ensure the integrity and security of transactions through a consensus process, in which all blockchain nodes belonging to the network verify and record all transactions.

Data recorded in the blockchain is referred to as on-chain data, and data managed on the basis of blockchain technology but not recorded in the blockchain is referred to as off-chain data. Each block constituting the blockchain is limited in size, and since the blockchain itself is an expensive resource, not all data that must be reliably managed can be recorded on the blockchain. That is, in response to a request for data access to the blockchain, there is a limit in storing all data as on-chain data on the blockchain.

SUMMARY

The technical problem to be achieved through one or more embodiments of the present invention is to provide a method and apparatus for processing a request for recording data on a blockchain at high speed.

Another technical problem to be achieved through one or more embodiments of the present invention is to provide a method and apparatus for, in response to a request for recording data on the blockchain, dividing the data into a case of storing the data as on-chain data and a case of storing the data as off-chain data and processing the data.

Another technical problem to be achieved through one or more embodiments of the present invention is to provide a method and apparatus for, when it is inappropriate to disclose data to be recorded on the blockchain to the outside, automatically storing the data as off-chain data Another technical problem to be achieved through one or more embodiments of the present invention is to provide a method and apparatus for allowing information about the recording of data to be transparently disclosed among members of the blockchain network, such as when substantially recording the data as on-chain data on the blockchain, by securely recording the recording information of the data even when the data to be recorded on the blockchain is stored as off-chain data.

According to an aspect of the present disclosure, there is provided a blockchain data recording method comprising determining a recording type as one of an on-chain type and an off-chain type by using a target data to be recorded in a blockchain, transmitting a first transaction proposal for recording the target data in a blockchain node configured to store an on-chain data on a blockchain to the blockchain node when the recording type is an on-chain type and recording the target data in a storage node provided to store an off-chain data, and transmitting a second transaction proposal for storing recording information of the target data in the blockchain to the blockchain node when the recording type is an off-chain type.

According to an embodiment, the determining may comprise determining the recording type using a size of the target data. Further, the determining the recording type using a size of the target data may comprise determining the recording type as the on-chain type when the size of the target data is less than a first threshold, determining the recording type as the off-chain type when the size of the target data is greater than or equal to a second threshold, and determining the recording type as one of the on-chain type and the off-chain type using a congestion level of the blockchain when the size of the target data is greater than or equal to the first threshold and less than the second threshold. The second threshold may be a value greater than the first threshold. Further, the determining the recording type using a size of the target data may comprise, determining the recording type as the on-chain type when the size of the target data is less than a first threshold, determining the recording type as the off-chain type when the size of the target data is greater than or equal to a second threshold, and determining the recording type as one of the on-chain type and the off-chain type by using some items of metadata of the target data when the size of the target data is greater than or equal to the first threshold and less than the second threshold. The second threshold may be a value greater than the first threshold. And some items may exclude the size of the target data. Further, the determining the recording type using a size of the target data may comprise, determining the recording type as the on-chain type when the size of the target data is less than a third threshold, and determining the recording type as the off-chain type when the size of the target data is greater than or equal to the third threshold. The third threshold may be a value that is dynamically adjusted based on a congestion level of the blockchain.

According to an embodiment, the determining may comprise, determining the recording type as the off-chain type when the target data is plain text, and determining the recording type as the on-chain type otherwise.

According to an embodiment, the determining may comprise, determining the recording type as the off-chain type when the target data includes a secure data, and determining the recording type as the on-chain type otherwise.

According to an embodiment, the recording may include, determining a storage type to store the target data by using the target data, the storage type may include a file system and a database. Further, the determining a storage type to store the target data may include, determining the storage type as a file system when a size of the target data is greater than or equal to a fourth threshold. Further, the determining a storage type to store the target data may include determining the storage type as a database when a size of the target data is less than the fourth threshold, or determining the storage type as a database when the target data is structured data in a predetermined format and determining the storage type as a file system otherwise.

According to another aspect of the present disclosure, there is provided a blockchain data recording device including a network interface connected to a blockchain node configured to store an on-chain data on a blockchain and a storage node provided to store an off-chain data, a memory and a processor for executing a blockchain transaction processor, an on-chain handler and an off-chain handler by executing a plurality of instructions loaded on the memory. The blockchain transaction processor may include a classifier for determining a recording type as one of an on-chain type and an off-chain type using a target data to be recorded in a blockchain. The off-chain handler may transmit and receive data to and from a storage node so that the target data is recorded in a storage node provided to store an off-chain data when the recording type is an off-chain type. The on-chain handler may transmit a first transaction proposal for recording the target data in a blockchain node configured to store an on-chain data on a blockchain to the blockchain node through the network interface when the recording type is an on-chain type, and transmit a second transaction proposal for storing recording information of the target data in a blockchain to the blockchain node through the network interface when the recording type is an off-chain type.

According to an embodiment, the blockchain transaction processor may further include an analyzer for monitoring the blockchain and automatically adjusting a setting value of the classifier according to the monitoring result. The classifier may determine the recording type using the automatically adjusted setting value.

According to an embodiment, the blockchain transaction processor may further include a storage classifier for determining a storage type to store the target data by using at least one of a size of the target data and whether the target data is a structured data in a predetermined format. The off-chain handler may transmit and receive data to and from a storage node of the determined storage type.

According to an embodiment, the recording type may be determined using a size of the target data. Further, the classifier may determine the recording type as the on-chain type when a size of the target data is less than a first threshold, determine the recording type as the off-chain type when a size of the target data is greater than or equal to a second threshold and determine the recording type as one of the on-chain type and the off-chain type using a congestion level of the blockchain when a size of target data is greater than or equal to the first threshold and less than the second threshold. The second threshold may be a value greater than the first threshold. Further, the classifier may determine the recording type as the on-chain type when a size of the target data is less than a first threshold, determine the recording type as the off-chain type when a size of the target data is greater than or equal to a second threshold, and determine the record type as one of the on-chain type and the off-chain type using some items of metadata of the target data when a size of the target data is greater than or equal to the first threshold and less than the second threshold. The second threshold may be greater than the first threshold, and some items may exclude a size of the target data. Further, the classifier may determine the recording type as the on-chain type when a size of the target data is less than a third threshold, determine the recording type as the off-chain type when a size of the target data is greater than or equal to the third threshold. The third threshold may be a value that is dynamically adjusted based on a congestion level of the blockchain.

According to an embodiment, the classifier may determine the recording type as the off-chain type when the target data is plain text, and determine the recording type as the on-chain type otherwise.

According to an embodiment, the classifier may determine the recording type as the off-chain type when the target data includes a secure data, and determine the recording type as the on-chain type otherwise.

The technical problems of the present invention are not limited to the technical problems mentioned above, and other technical problems not mentioned will be clearly understood by those skilled in the art from the following description.

DETAILED DESCRIPTION

Hereinafter, exemplary embodiments of the present disclosure will be described with reference to the attached drawings. Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second. A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

Figure 1:
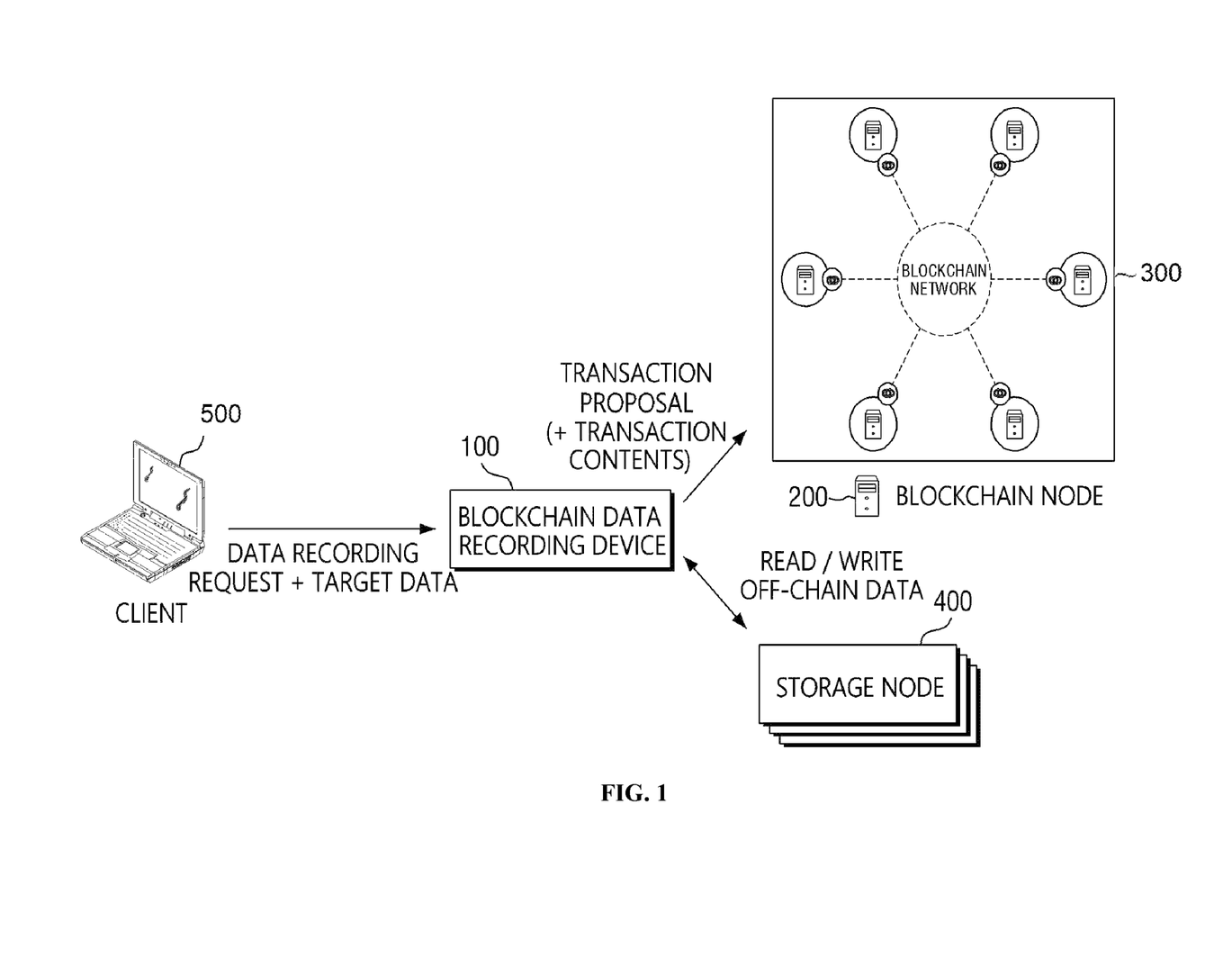
FIGS. 1 and 2 are block diagrams of a blockchain data recording system according to an embodiment of the present invention.

FIG. 1 is an exemplary block diagram showing a blockchain data recording system according to an embodiment of the present invention.

As shown in FIG. 1, the blockchain data recording system according to the present embodiment may include one or more blockchain nodes 200, one or more storage nodes 400, and blockchain data recording device 100 constituting the blockchain network 300.

The blockchain node 200 is a node that configures a blockchain network 300 of a peer-to-peer (P2P) structure and operates according to the blockchain protocol. Each blockchain node 200 can manage a ledger. In some embodiments, the ledger may include a blockchain, in which transaction data is recorded, and a state database (DB), in which state records (e.g., state values corresponding to state keys) are stored. Further, the transaction data may include a state record associated with the transaction. The blockchain node 200 can share various smart contracts and transaction data through the blockchain, and can ensure the integrity and security of transactions through a consensus process. The data recorded in the blockchain will be referred to as on-chain data.

The storage node 400 is a device that stores off-chain data. The life cycle of the off-chain data is recorded as the on-chain data without missing. For example, CRUD (Create, Read, Update, Delete) history of the off-chain data is recorded as the on-chain data.

The block chain data recording device 100 receives a data recording request from the client 500 and determines the processing type of the data recording request as one of on-chain type and off-chain type based on the target data according to the received data recording request. The processing type of the data recording request will be referred to as a 'recording type.'

FIG. 1 shows an example, in which the blockchain data recording device 100 is implemented as a single computing device, but the first function of the blockchain data recording device 100 may be implemented in a first computing device, and the second function may be implemented in a second computing device.

The on-chain type indicates that the target data is recorded as on-chain data on the blockchain.

The off-chain type indicates that the target data is recorded as off-chain data on the storage node 400, but at the same time, the recording information is also recorded as on-chain data on the blockchain as well.

In some embodiments, the blockchain data recording device 100 determines the processing type of the data recording request using the target data. 'Use' of the target data may mean that the processing type is determined based on only the target data, or that the processing type is determined by referring to the target data and one or more other data together.

In some embodiments, using the 'target data' may mean determining the processing type based on metadata obtained from the target data, mean determining processing type based on the result of evaluating the context of the target data, or mean determining the processing type based on one or more attributes of the target data.

The target data may be structured data according to a predetermined format, a file encoded in a predetermined manner, time series data, streaming data, or string data.

In some embodiments, the blockchain data recording device 100 may determine the recording type using the size of the target data. For example, the block chain data recording device 100 may determine the recording type based on a result of comparing the size of the target data with a threshold. The threshold may be a predetermined fixed threshold, or may be a threshold dynamically adjusted by the blockchain data recording device 100 or other device.

In some other embodiments, the blockchain data recording device 100 may determine the recording type using the size of the target data. For example, the block chain data recording device 100 may determine the recording type as an on-chain type when the size of the target data is less than a threshold, and may determine the recording type as an off-chain type when the size of the target data is greater than or equal to the threshold. According to this, block chain data recording device 100 yields an effect of preventing problems such as an increase in the latency of the blockchain as a result of the congestion level of the entire blockchain increases when a large amount of data is recorded on the blockchain as on-chain data.

In some other embodiments, the blockchain data recording device 100 may determine the recording type using the contents of the target data. For example, the block chain data recording device 100 may determine the recording type as an off-chain type when the target data is plain text, and determine the recording type as an on-chain type otherwise. For example, the blockchain data recording device 100 may determine the recording type as an on-chain type when the target data is encrypted or encoded. Accordingly, block chain data recording device 100 yields an effect of preventing the occurrence of security-related problems for data that is sensitive to security or external leakage by ensuring that only data, of which contents can be checked through the procedures of decryption, decoding, etc. are recorded on the blockchain as the on-chain data.

The blockchain data recording device 100 receives the data recording request from the client 500. The data recording request may mean that one or more methods executed by the blockchain data recording device 100 are called. In some embodiments, a microservice type application executing on the client 500 may transmit the data recording request. The data recording request results in adding a transaction to the blockchain and accessing off-chain data stored in the storage node 400 or storing new off-chain data in the storage node 400.

Although the data recording request results in adding a transaction to the blockchain, the client 500 should not transmit the data recording request directly to the blockchain node 200, but should transmit it to the blockchain data recording device 100. In one embodiment, the blockchain node 200 stores identification information of the blockchain data recording device 100 and may ignore requests received from other computing devices other than the blockchain data recording device 100.

Further, the data recording request results in accessing the off-chain data or storing new off-chain data to the storage node 400, but the client 500 should not transmit the service request directly to the storage node 400, but instead transmit it to the blockchain data recording device 100. In one embodiment, the storage node 400 also stores identification information of the blockchain data recording device 100 and may ignore requests received from other computing devices other than the blockchain data recording device 100.

The blockchain data recording system according to this embodiment reflects the change history (provenance) of off-chain data stored on the storage node 400 to the blockchain without missing. To this end, the block chain data recording devices 100, when the recording type is determined as an off-chain type, performs the first operation of recording the target data in the storage node 400 together with the second operation of transmitting a second transaction proposal for storing the recording information of the target data in the blockchain to the blockchain node.

In some embodiments, the block chain data recording device 100 may ensure synchronization by simultaneously performing the first operation and the second operation.

In some other embodiments, after performing the first operation, the block chain data recording device 100 may perform the second operation as soon as it is confirmed that the off-chain data is safely stored in the storage node 400, thereby guaranteeing the accuracy of the recording information of the target data on the blockchain.

In some embodiments, after performing the second operation, the blockchain data recording device 100 performs the first operation as soon as it is confirmed that the recording information of the target data is safely stored on the block chain, thereby preventing off-chain data from being stored in the storage node 400 in a situation where the recording information of the target data is not recorded on the blockchain.

As already described, when the recording type is on-chain type, the blockchain data recording device 100 transmits a transaction proposal for recording the target data itself of the data recording request to the blockchain as on-chain data to the blockchain node 200. The transaction proposal includes the transaction contents according to the service request. The transaction contents may mean execution parameters of a smart contract.

The transaction contents may be created by the blockchain data recording device 100 using reference data received along with the data recording request or received after the service request. The reference data may be, for example, meta data of the target data, the entire target data, or a part of the target data. The reference data may be metadata of the management target data extracted by the blockchain data recording device 100 itself from the target data received from the client 500.

The blockchain node 200 may receive the transaction proposal and execute a smart contract. The blockchain node 200 does not immediately update the ledger upon receipt of the transaction proposal, but evaluates the transaction contents of the transaction proposal in light of the logic of the smart contract and the contents of the ledger stored by the blockchain node 200, and creates a smart contract execution result reflecting the evaluation result.

In some embodiments, the blockchain node 200 may refer to off-chain data stored in the storage node 400 in the process of executing the smart contract. For example, when the recording type of the data recording request is determined as an on-chain type, the blockchain data recording device 100 may create the transaction proposal for recording the target data on the blockchain as on-chain data and transmit the transaction proposal to the blockchain node 200, and at this time, the logic of the smart contract executed by the blockchain node 200 may refer to off-chain data stored in the storage node 400. In order to do this and as shown in FIG. 2, the blockchain node 200 may directly access the storage node 400 through the off-chain data direct querying channel 90, thereby improving the speed of querying the off-chain data.

The blockchain node 200 transmits the execution result of the smart contract and the endorsement of the blockchain node 200 to the blockchain data recording device 100 as a reply to the transaction proposal. Blockchain data recording device 100 aggregates the transaction proposal replies received from each blockchain node 200, and determines whether a consensus determination on the transaction proposal transmitted by blockchain data recording device 100 is possible. The blockchain data recording device 100 may perform the consensus determination according to a predefined endorsement policy.

When it is determined that a consensus determination on the transaction proposal is possible, the blockchain data recording device 100 transmits the transaction proposal for adding the transaction contents of the transaction proposal to the ledger as a new transaction to the blockchain node 200. For example, when the protocol of the blockchain is a Hyperledger fabric, the transaction request will be transmitted to the node in charge of the ordering service among the blockchain nodes 200. The node in charge of the ordering service aggregates a transaction request to create a block, delivers the created block to all the storage nodes (committing peer), and each storage node confirms that each of all transactions in the delivered block complies with the endorsement policy, and if there is no problem, additionally connects the block to the existing blockchain.

Figure 2:
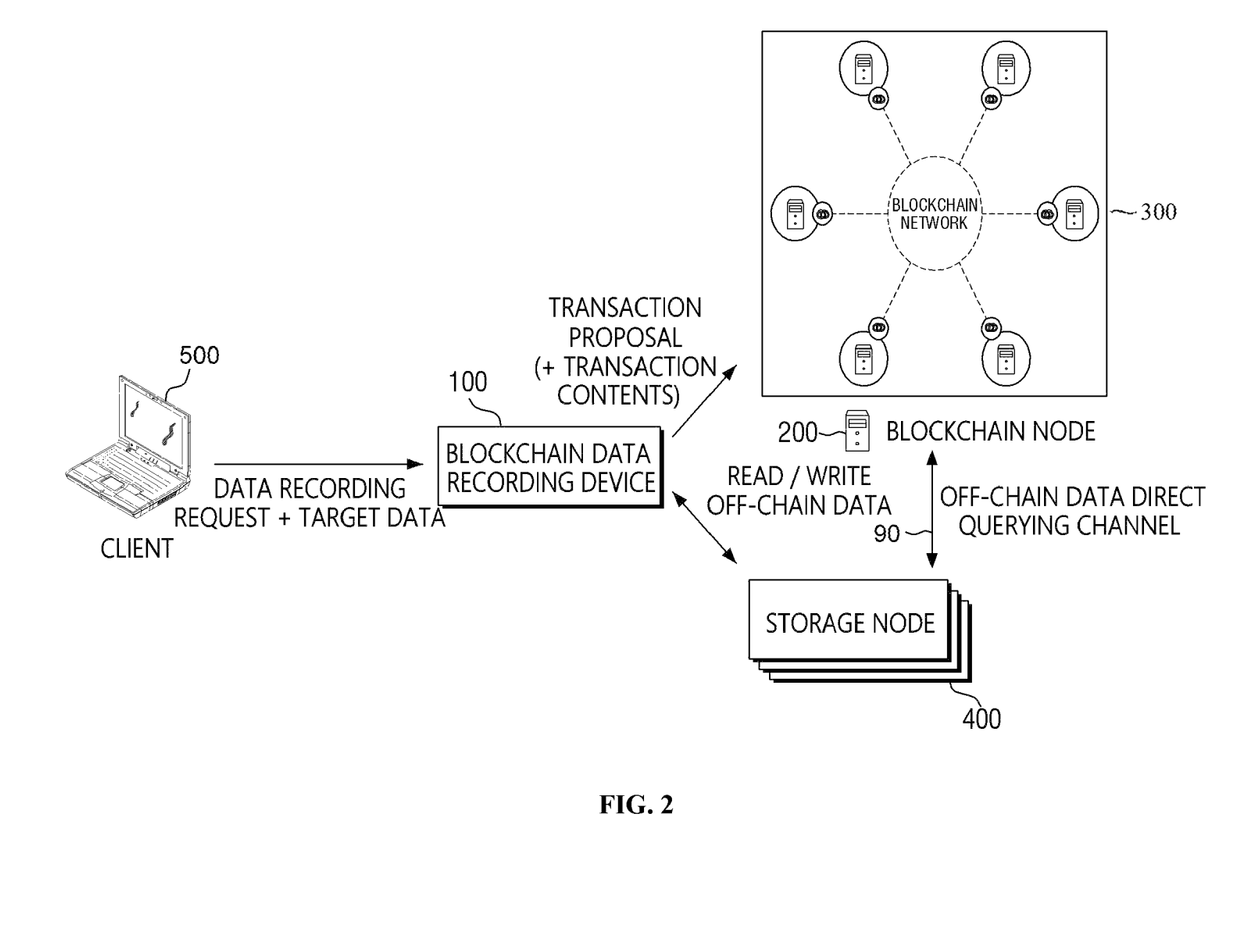

The block chain data recording system described so far with reference to FIGS. 1 to 2, despite the client's request to record data on the blockchain, in some cases, records the recording target data in the storage node 400 as off-chain data rather than on the blockchain, thereby preventing the overall performance of the blockchain from deteriorating and delaying the processing of the client's request due to an excessive load applied to the blockchain. However, even if the target data is recorded as off-chain data, since the recording information such as the history of the record is recorded on the blockchain, the history of the data recording itself is transparently shared among members through the blockchain.

In some embodiments, whether the type of recording is an on-chain type or an off-chain type may be determined based on the size of the target data or the contents of the target data. The method of determining the recording type or the method of additionally determining the type of storage when the recording type is determined as off-chain will be described in more detail through embodiments described below.

Figure 3:
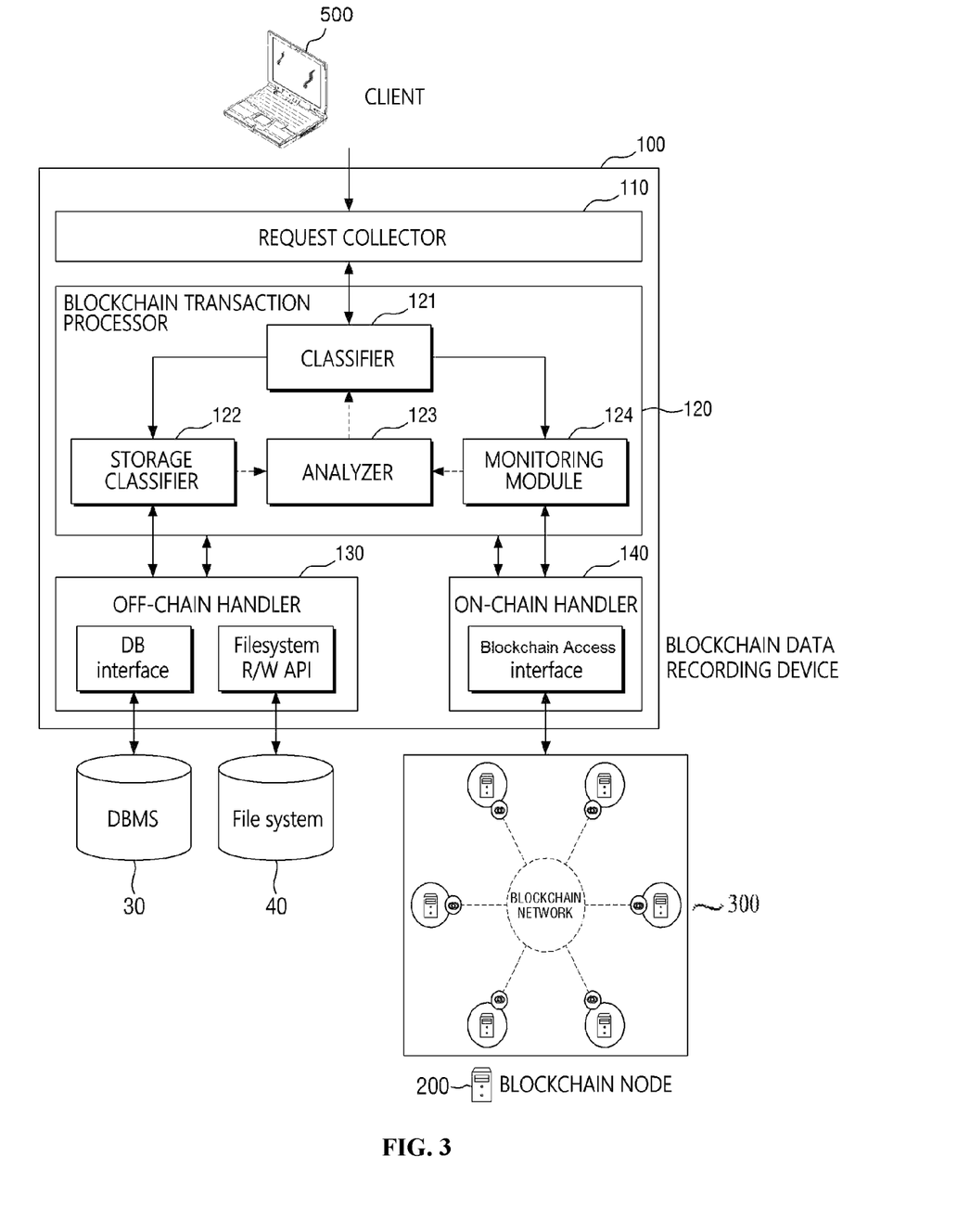
FIG. 3 is a block diagram of a blockchain data recording device according to another embodiment of the present invention.

Hereinafter, a configuration and operation of a blockchain data recording device according to another embodiment of the present invention will be described with reference to FIG. 3. As shown in FIG. 3, the block chain data recording device 100 according to the present embodiment may include a block chain transaction processor 120. Further, the blockchain data recording device 100 may further include a request collector 110, an off-chain handler 130 and an on-chain handler 140.

The request collector 110 provides a data recording request received from the client 500 to the blockchain transaction processor 120. In some embodiments, the request collector 110 may create a data recording request on its own. That is, the blockchain data recording device determines that specific data should be stored on the blockchain and can generate a data recording request on its own.

The blockchain transaction processor 120 determines a recording type for the data recording request as one of an on-chain type and an off-chain type. When the recording type is on-chain type, blockchain transaction processor 120 may control the on-chain handler 140 so that the first transaction proposal for recording the target data in the blockchain node 200 is transmitted to the blockchain node 200. When the recording type is an off-chain type, blockchain transaction processor 120 may control the on-chain handler 140 so that a second transaction proposal for storing the recording information of the target data in the blockchain is transmitted to the blockchain node 200, and also control the off-chain handler 130 so that the target data can be recorded in the storage node in one way of the DBMS (i.e. database management system) 30 or the file system 40. Hereinafter, the detailed configuration of the blockchain transaction processor 120 will be described.

The classifier 121 determines a recording type of the data recording request as one of an on-chain type and an off-chain type. For example, the classifier 121 may determine the recording type using target data of the data recording request.

The off-chain handler 130 provides an interface to access storage 30 and 40 for each type implemented in the storage node. Similarly, the on-chain handler 140 also provides an interface to access the blockchain node 200.

In some embodiments, the classifier 121 may determine the recording type based on the size of the target data. This will be described in more detail with reference to FIG. 4.

Figure 4:
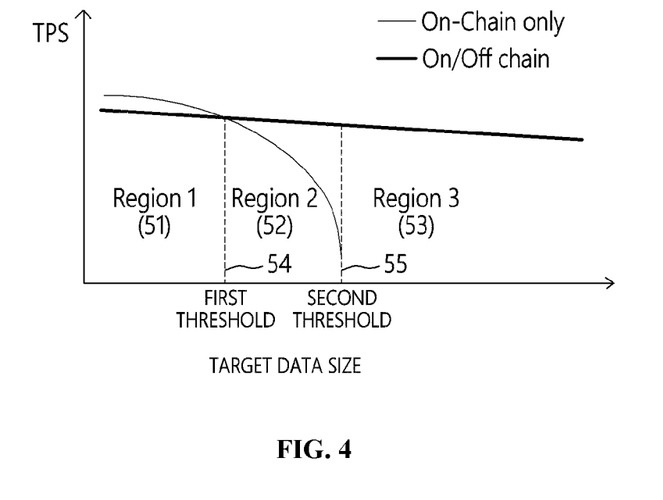
FIGS. 4 and 5 are diagrams for describing that an on-chain type and an off-chain type are classified based on the size of data according to some embodiments of the present invention.

The larger the size of data stored as on-chain data, the higher the congestion level of the blockchain due to the storage of the data, and as a result, the performance of the blockchain (e.g., the number of transactions processed per second; TPS) decreases. In FIG. 4, when storing data as on-chain data, in the first area 51, the blockchain performance of storing data as on-chain data is higher than that of storing data as off-chain data, whereas in the second area 52, it is indicated that the blockchain performance of storing data as off-chain data is higher than that of storing data as on-chain data.

The third area 53 indicates an area, in which data cannot be stored as on-chain data. That is, when the size of the target data is large enough to be not stored in each block of the blockchain, the target data cannot be stored as on-chain data. For example, the second threshold 55 may indicate the maximum size of data storage of the blockchain.

Reflecting the characteristics of the first area 51 and the third area 53, the classifier 121 may determine the recording type as the on-chain type when the size of the target data is less than the first threshold 54, and determine the recording type as the off-chain type when the size of the target data is greater than or equal to the second threshold 55.

The second area 52 is an area, in which on-chain type data can be recorded and an off-chain type data can be recorded as well. Hereinafter, some embodiments of the method for determining the recording type of the classifier 121 in the second area 52 will be described.

The classifier 121 may uniformly determine the recording type in the second area 52 as an off-chain type, or uniformly determine it as the on-chain type. Since this embodiment can be implemented with simple logic, an effect of reducing the computational load of the classifier 121 is obtained.

Further, the classifier 121 may determine the recording type as one of the off-chain type and the on-chain type using information other than the size of target data.

Further, the classifier 121 may determine the recording type based on time information. The classifier 121 may prevent the congestion level of the blockchain from further increasing by determining the record type as an off-chain type in a time zone previously determined as the congestion time zone of the blockchain.

Further, the classifier 121 may determine the recording type based on the owner of the client that generated the data recording request. For example, when a user priority is specified for the owner of the client, the classifier 121 determines the recording type as an on-chain type when the priority of a user is high, thereby limiting the users who can record data in a blockchain that is an expensive resource.

Further, the classifier 121 may determine the recording type in the same manner as the recording type of the immediately preceding data recording request. The immediately preceding data recording request may indicate a data recording request processed by the classifier 121 immediately before the data recording request.

Further, the classifier 121 may determine the recording type using the congestion level of the blockchain. Hereinafter, it is described in more detail.

For example, the classifier 121 may determine the recording type using the comparison result of the congestion level of the blockchain with a reference value. In more detail, the classifier 121 may determine the recording type as an off-chain type so as not to put a load on the blockchain when the congestion level of the blockchain is greater than or equal to a reference value. The congestion level may be evaluated by the number of transaction requests per second, etc.

The congestion level may affect the performance of the blockchain. In other words, the performance of the blockchain can also be understood as an indicator of the congestion level. When evaluating the performance as the number of transactions per second (TPS), the classifier 121 determines the recording type as an off-chain type when the TPS of the blockchain is less than a reference value in the second area 52, thereby preventing the blockchain from becoming more congested.

Further, the classifier 121 may determine the recording type using some items of the metadata of the target data. It may be understood that some items indicate values other than the size of the target data. For example, the classifier 121 may use at least part of a data type, a security level, an organization of a data owner, and an age and priority after creation of the data among the metadata of the target data to determine the recording type.

In the above, various embodiments, in which the classifier 121 determines the recording type in the second area, have been described. The recording type can be determined according to various criteria in addition to the above described embodiments.

Figure 5:
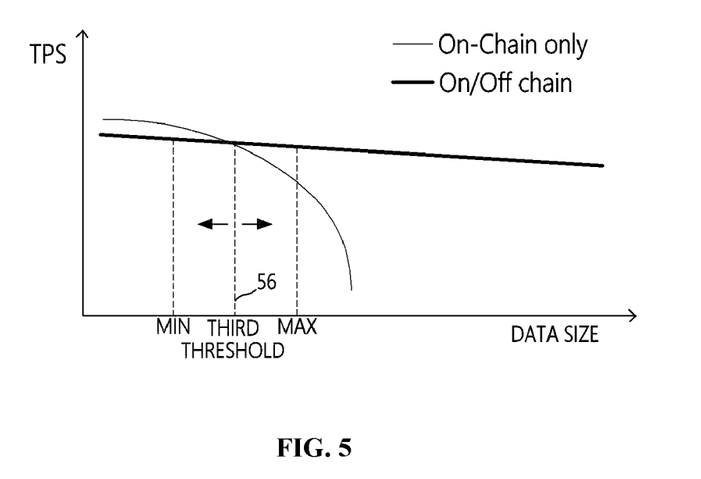

In some other embodiments, the classifier 121 determines the recording type based on the size of the target data, but as shown in FIG. 5, if the size of the target data is greater than or equal to the third threshold 56, may determine the recording type as an off-chain type, and if the size of the target data is less than a third threshold 56, determine the recording type as an on-chain type.

The third threshold 56 may be a dynamically adjusted value. The third threshold 56 may be a value that is dynamically adjusted based on the congestion level of the blockchain. For example, the higher the number of transaction requests per second entering into the blockchain, the third threshold 56 may be automatically adjusted to be lowered. For example, when the number of transactions processing per second (TPS) of the blockchain is lower, the third threshold 56 may also be automatically adjusted to be lower. That is, the third threshold 56 may be dynamically adjusted to be lower as the congestion of the blockchain is higher, so that the load can be reduced when the congestion of the blockchain is high.

For dynamic adjustment of the third threshold 56, a monitoring module 124 and an analyzer 123 may be further included in the blockchain transaction processor 120. The monitoring module 124 monitors the state of the blockchain network through the on-chain handler 140, provides the results to the analyzer 123, and the analyzer 123 analyzes the provided results as described above, and dynamically adjusts the third threshold 56 using the analysis result. As illustrated in FIG. 5, the adjustment of the third threshold 56 may be performed in an interval between the minimum value MIN and the maximum value MAX.

Further, in some embodiments, the classifier 121 may determine the recording type as an off-chain type when the contents of the target data are not appropriate to be recorded as on-chain data. For example, the classifier 121 may determine the recording type as the off-chain type when the target data is plain text, and determine the recording type as an on-chain type otherwise. For example, when the target data is encrypted or encoded, the classifier 121 may determine the recording type as an on-chain type. The classifier 121 may determine whether the target data is plain text using a known method such as a Chi-square test.

When plain text is recorded in the blockchain ledger, considering that the blockchain node subscribed to the blockchain network can read the plain text due to the characteristic of the blockchain technology, classifier 121 can prevent the plain text from being recorded in the blockchain ledger.

Further, in some embodiments, the classifier 121 may determine the recording type as the off-chain type when the target data includes secure data, and determine the recording type as the on-chain type otherwise. The classifier 121 may determine whether the target data includes secure data, such as by querying the security credit code from the target data.

When the secure data is recorded in the blockchain ledger, considering that the secure data can be read in the blockchain node substituted to the blockchain network due to the characteristic of the blockchain technology, classifier 121 can prevent the plain text from being recorded in the blockchain ledger.

Referring now to FIG. 3, when the blockchain transaction processor 120 determines the recording type as an off-chain type, the target data is stored in the storage node as off-chain data. At this time, a plurality of types of storage may be used to improve the recording speed of large amount of data. The storage classifier 122 can determine the storage type.

The storage classifier 122 may use the target data to determine a storage type to store the target data. For example, the storage classifier 122 may determine the storage type based only on the target data, or may determine the storage type by further considering the target data and one or more additional information.

In one embodiment, when the size of the target data is greater than or equal to a fourth threshold, the storage classifier 122 may determine the storage type as the file system 30, and when the size of the target data is less than the fourth threshold, determine the storage type as the database 40. The fourth threshold may be, for example, a value exceeding the second threshold 55 described with reference to FIG. 4. Further, the fourth threshold, for example, may be a value exceeding the third threshold 56 described with reference to FIG. 5. In the present embodiment, it will be understood that the file system 30 is a more appropriate storage type for storing a large amount of data compared to the database 40.

In another embodiment, the storage classifier 122 may determine the storage type as the database 40 when the target data is structured data in a predetermined format, and in other cases, determine the storage type as a file system 30. The present embodiment will be understood from the point that it is suitable for database 40 storage in the case of the structured data.

Next, with reference to FIG. 6, the configuration and operation of a blockchain data recording system according to another embodiment of the present invention will be described.

The blockchain data recording system according to an embodiment of the present embodiment includes the respective blockchain data recording devices 100*a* and 100*b* of the organization A 10 and the organization B 20, respectively, and storage nodes 400*a* and 400*b* of the respective organization A 10 and the organization B 20 respectively. The client 500*a* of the organization A (10) transmits a data recording request to the blockchain data recording device 100*a* of the organization A 10, and the client 500*b* of the organization B (20) transmits a data recording request to the blockchain data recording device 100*b* of the organization B 20.

Figure 6:
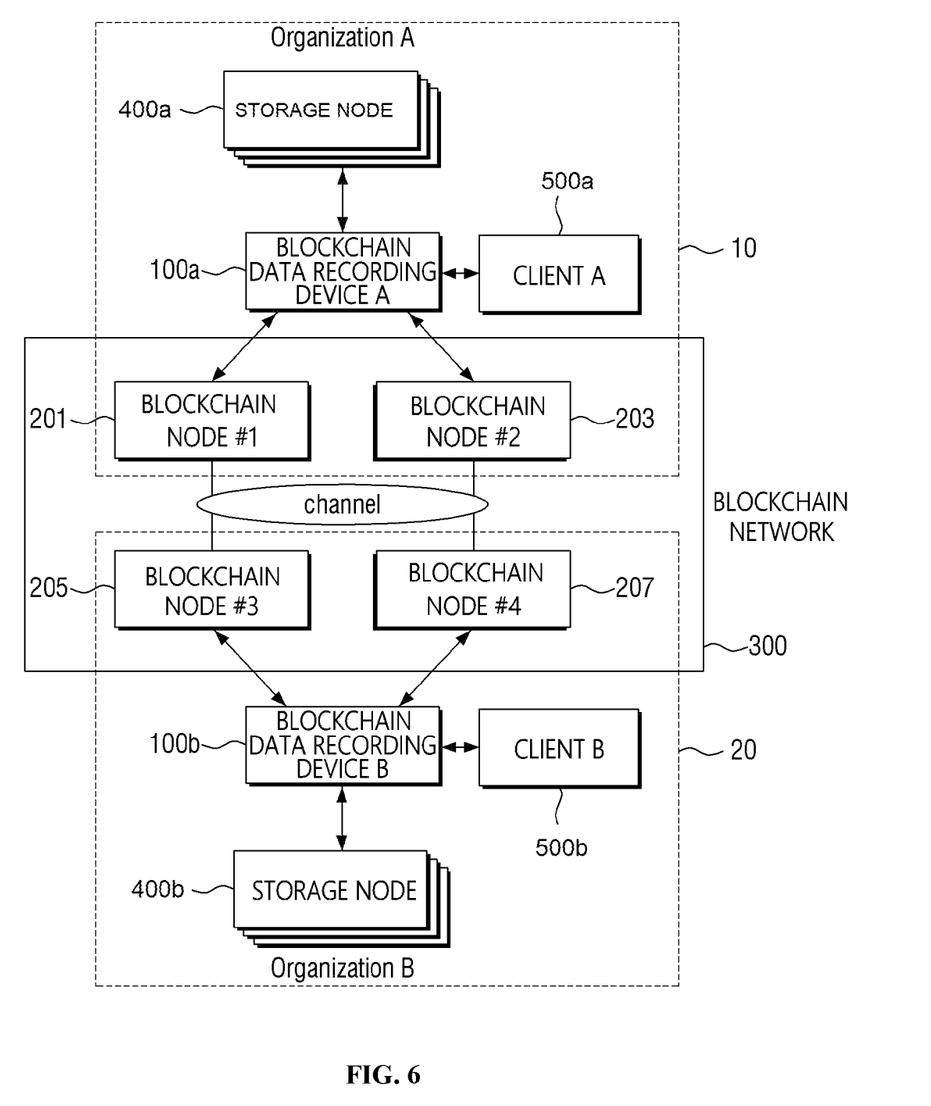
FIG. 6 is a block diagram of a blockchain data recording system according to another embodiment of the present invention.

As shown in FIG. 6, on-chain data is shared between organization A 10 and organization B 20 through blockchain nodes 201, 203, 205, and 207 belonging to the blockchain network 300. On the other hand, since the off-chain data is stored in individual storage nodes 400*a* and 400*b*, it is not shared between the organization A 10 and the organization B 20.

The blockchain data recording devices 100*a* and 100*b* of the blockchain data recording system shown in FIG. 6, for example, may determine the recording type of a data recording request for data that should not be shared with other organizations as an off-chain type, and determine the recording type of a data recording request for data that can be shared with other organizations as an on-chain type.

Hereinafter, an exemplary blockchain data recording device 100 capable of implementing the blockchain data recording device described in various embodiments of the present invention will be described with reference to FIG. 7.

Figure 7:
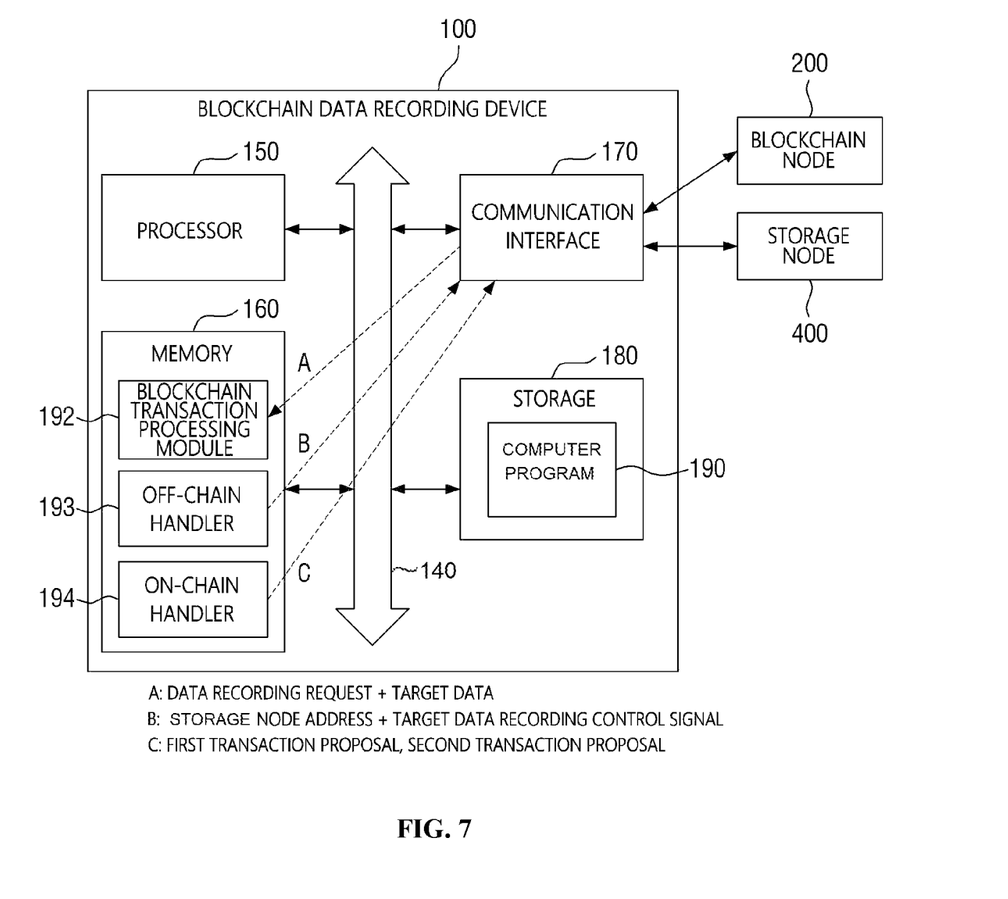
FIG. 7 is a hardware block diagram of a blockchain data recording device according to another embodiment of the present invention.

FIG. 7 is an exemplary hardware block diagram illustrating the blockchain data recording device 100. As shown in FIG. 7, the blockchain data recording device 100 may include a memory 160 that loads a computer program 190 performed by one or more processors 150, a system bus 140, a communication interface 170, and a storage 180 for storing the computer program 190. In FIG. 7, only components related to the embodiment of the present invention are shown. Accordingly, it can be seen that those skilled in the art to which the present invention pertains may understand that other general-purpose components in addition to the components shown in FIG. 7 may be further included.

The processor 150 controls the overall operation of each component of the computing device 100. The processor 150 may be configured to include at least one of a central processing unit (CPU), a micro]processor unit (MPU), a micro controller unit (MCU), a graphics processing unit (GPU), or any type of processor well known in the art. Further, the processor 150 may perform operations on at least one application or program for executing a method/operation according to various embodiments of the present invention. The blockchain data recording device 100 may include one or more processors.

The memory 160 stores various data, commands and/or information. The memory 160 may load one or more programs 190 from the storage 180 to execute methods/operations according to various embodiments of the present invention. For example, when the computer program 190 is loaded into the memory 160, logic (or module) as illustrated in FIG. 4 may be implemented on the memory 160. An example of the memory 160 may be RAM, but is not limited thereto.

The bus 140 provides a communication function between components of the blockchain data recording device 100. The bus 140 may be implemented as various types of buses, such as an address bus, a data bus, and a control bus.

The communication interface 170 supports wired and wireless Internet communication of the blockchain data recording device 100. The communication interface 170 may support various communication methods other than Internet communication. To this end, the communication interface 170 may be configured to include a communication module well known in the technical field of the present invention.

The storage 180 may store one or more computer programs 190 permanently. The storage 180 may be configured to include a non-volatile memory such as a read only memory (ROM), an erasable programmable ROM (EPROM), an electrically erasable programmable ROM (EEPROM), a flash memory, a hard disk, a removable disk, or any form of computer-readable recording medium well known in the technical field, to which the present invention pertains.

The computer program 190 may include one or more instructions, in which methods/operations according to various embodiments of the present invention are implemented. When the computer program 190 is loaded into the memory 160, the processor 150 may perform the methods/operations according to various embodiments of the present invention by executing the one or more instructions. For example, when the computer program 190 is loaded into memory 160, the blockchain transaction processing module 192, in which the blockchain transaction processor 120 described with reference to FIG. 3 is implemented, and the off-chain handler 193, in which the off-chain handler 130 described with reference to FIG. 3 is implemented, and the on-chain handler 194, in which the on-chain handler 140 is implemented, may be implemented.

Figure 8:
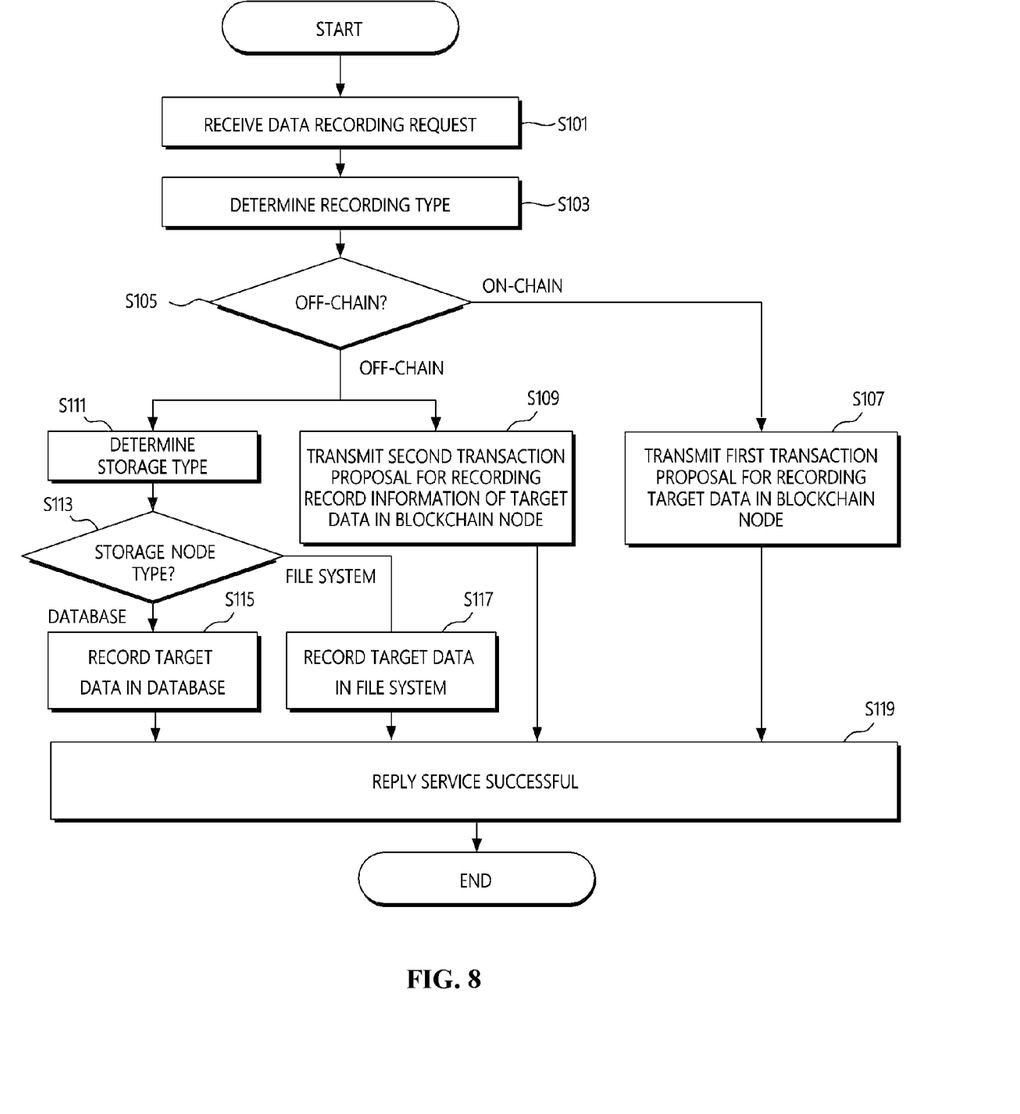
FIGS. 8 to 9 are flowcharts of a method for recording blockchain data according to another embodiment of the present invention.
Figure 9:
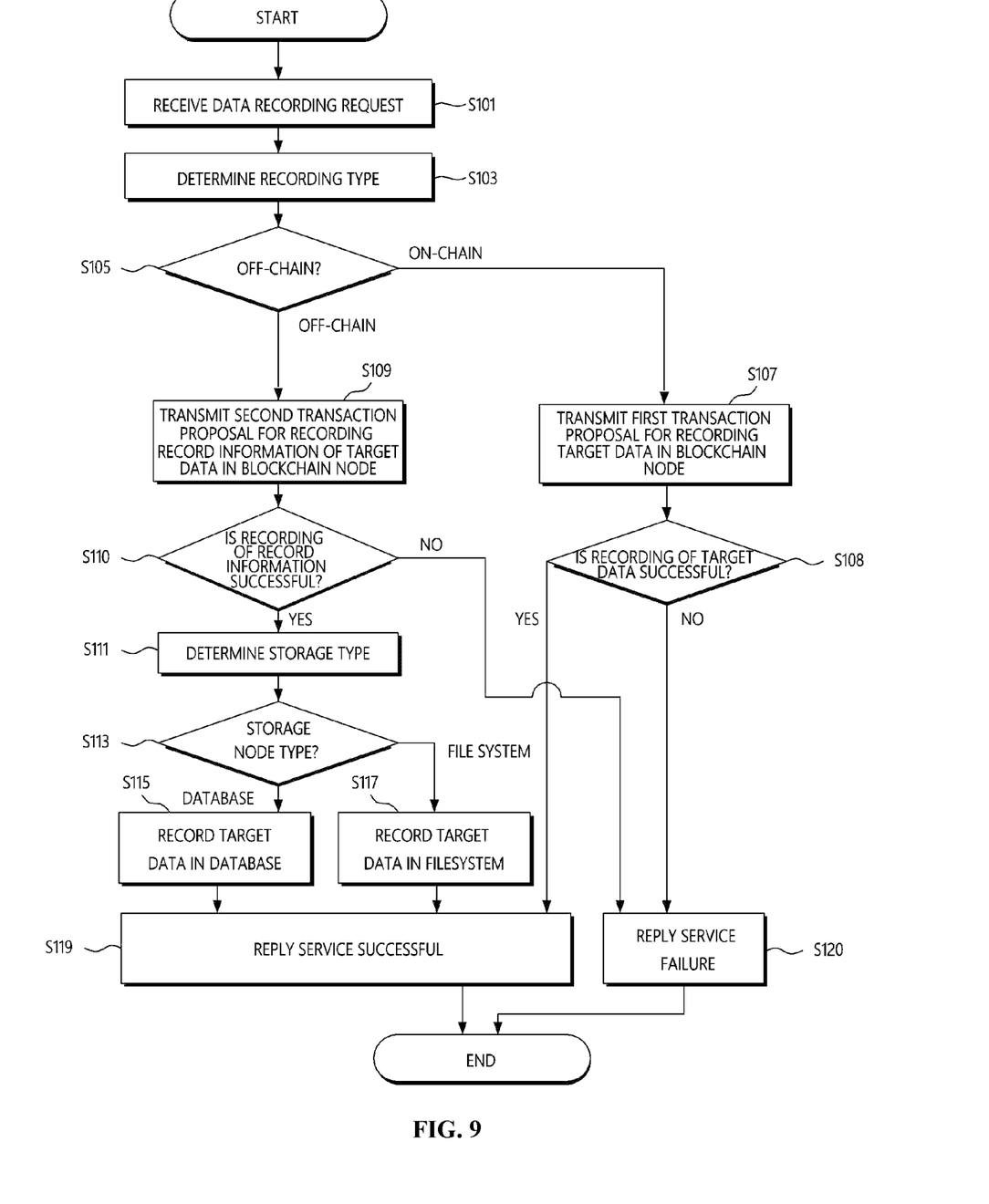

FIGS. 8 to 9 are flowcharts of a method for recording blockchain data according to another embodiment of the present invention. FIGS. 8 to 9 may be performed by a computing device, such as the blockchain data recording device 100 described with reference to FIG. 3. To facilitate understanding, operations overlapped with those described with reference to FIGS. 1 to 7 will be briefly described.

With reference to FIG. 8, when a data recording request is received (S101), the recording type is determined (S103). When the determined recording type is on-chain type (S105), a transaction proposal for recording the target data in the blockchain node is transmitted to the blockchain node (S107). On the other hand, when the recording type is determined as an off-chain type (S105), a transaction proposal for recording the recording information of the target data in the blockchain node is transmitted to the blockchain node (S109). Further, the target data is stored in the storage node.

As already described above, the type of storage may be determined using the target data (S111). When the type of the storage node is determined as a file system in step S113, the target data will be stored as a file through the file system in step S117, and when the type of the storage node is determined as a database in step S113, the target data is recorded in the database in step S115. Finally, if the recording of the target data is successful, a service success is transmitted as a response to the data recording request in step S119.

In some embodiments, some operations may be modified to ensure consistency of the recording of on-chain data and the recording of off-chain data. This will be described with reference to FIG. 9. When the recording type is an on-chain type, when the on-chain data is normally recorded on the blockchain, a service success reply is generated (S108, S119), and when the on-chain data is not normally recorded on the blockchain, the service failure reply is generated (S108, S120).

When the recording type is an off-chain type, it is first checked whether the recording information of the target data is recorded as on-chain data in a blockchain node (S109, S110). When the record information is normally recorded (S110), the next off-chain data recording operation described referring to FIG. 8 will be performed (S111, S113, S115, S117, S119). On the other hand, when the record information is not normally recorded (S110), an off-chain recording related operation is not performed, and a service failure reply is generated (S120).

As shown in FIG. 9, in some embodiments, when the recording type is an off-chain type, it is first checked whether the off-chain data is normally recorded in storage, and then when it is normally recorded, it is also possible for the recording information to be recorded as on-chain data.

In some embodiments, unlike described with reference to FIGS. 8 to 9, when the recording type is an off-chain type, the recording information is first recorded as on-chain data, and then off-chain data can be recorded in the storage. Further, the recording information is first recorded as on-chain data, and when the on-chain data is normally recorded in the blockchain, off-chain data may be recorded in storage. That is, in the off-chain recording type, the technical idea of the present invention is not limited by the recording order of off-chain data and on-chain data.

The technical features of the present disclosure described with reference to FIGS. 1 to 9 so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A blockchain data recording method comprising:
   determining a recording type as one of an on-chain type and an off-chain type by according to a target data to be recorded in a blockchain;
   transmitting a first transaction proposal to record the target data in a blockchain node configured to store an on-chain data on the blockchain to the blockchain node when the recording type is the on-chain type; and
   recording the target data in a storage node configured to store an off-chain data, and transmitting a second transaction proposal for storing recording information of the target data in the blockchain to the blockchain node when the recording type is the off-chain type.

2. The blockchain data recording method of claim 1, wherein the determining comprises determining the recording type according to a size of the target data.

3. The blockchain data recording method of claim 2, wherein the determining comprises:
   determining the recording type as the on-chain type when the size of the target data is less than a first threshold;
   determining the recording type as the off-chain type when the size of the target data is greater than or equal to a second threshold which is a value greater than the first threshold; and
   determining the recording type as one of the on-chain type and the off-chain type according to a congestion level of the blockchain when the size of the target data is greater than or equal to the first threshold and less than the second threshold.

4. The blockchain data recording method of claim 2, wherein the determining further comprises:
   determining the recording type as the on-chain type when the size of the target data is less than a first threshold;
   determining the recording type as the off-chain type when the size of the target data is greater than or equal to a second threshold which is a value greater than the first threshold; and
   determining the recording type as one of the on-chain type and the off-chain type according to at least one of items of metadata of the target data when the size of the target data is greater than or equal to the first threshold and less than the second threshold, the at least one of items being other than the size of the target data.

5. The blockchain data recording method of claim 2, wherein the determining further comprises:
   determining the recording type as the on-chain type when the size of the target data is less than a third threshold; and
   determining the recording type as the off-chain type when the size of the target data is greater than or equal to the third threshold which is a value that is dynamically adjusted according to a congestion level of the blockchain.

6. The blockchain data recording method of claim 1, wherein the determining comprises:
   determining the recording type as the off-chain type when the target data is in a plain text format; and
   determining the recording type as the on-chain type when the target data is of a format other than the plain text format.

7. The blockchain data recording method of claim 1, wherein the determining comprises:
   determining the recording type as the off-chain type when the target data includes a secure data; and
   determining the recording type as the on-chain type when the target data is absent of the secure data.

8. The blockchain data recording method of claim 1, wherein the recording of the target data in the storage node comprises determining a storage type selected from a file system type and a database type to store the target data according to the target data.

9. The blockchain data recording method of claim 8, wherein the determining of the storage type to store the target data comprises:
   determining the storage type as the file system type when a size of the target data is greater than or equal to a fourth threshold; and
   determining the storage type as the database type when the size of the target data is less than the fourth threshold.

10. The blockchain data recording method of claim 8, wherein the determining of the storage type to store the target data comprises:
    determining the storage type as the database type when the target data is in a structured data format; and
    determining the storage type as the file system when the target data is other than the structured data format.

11. A blockchain data recording device comprising:
    a network interface connected to a blockchain node configured to store an on-chain data on a blockchain and a storage node configured to store an off-chain data;
    a memory;
    a blockchain transaction processor comprising a classifier to determine a recording type as one of an on-chain type and an off-chain type according to a target data to be recorded in the blockchain;
    an off-chain handler to transmit and receive an off-chain data to and from a storage node so that the target data is recorded in the storage node provided to store the off-chain data when the recording type is the off-chain type;
    an on-chain handler to transmit a first transaction proposal to record the target data in a blockchain node configured to store an on-chain data on the blockchain to the blockchain node through the network interface when the recording type is the on-chain type, and to transmit a second transaction proposal to store recording information of the target data in the blockchain to the blockchain node through the network interface when the recording type is the off-chain type; and
    a processor to execute the blockchain transaction processor, the on-chain handler and the off-chain handler by executing a plurality of instructions loaded in the memory.

12. The blockchain data recording device of claim 11, wherein the blockchain transaction processor further comprises an analyzer to monitor the blockchain and automatically adjust a setting value of the classifier according to the monitoring result; and
    the classifier to determine the recording type by using the automatically adjusted setting value.

13. The blockchain data recording device of claim 11, wherein the blockchain transaction processor further comprises:
    a storage classifier to determine a storage type to store the target data by using at least one of a size of the target data and whether the target data is in a structured data format; and
    the off-chain handler to transmit and receive the off-chain data to and from the storage node of the determined storage type.

14. The blockchain data recording device of claim 11, wherein the recording type is determined by using a size of the target data.

15. The blockchain data recording device of claim 14, wherein the classifier is configured to:
   determine the recording type as the on-chain type when the size of the target data is less than a first threshold;
   determine the recording type as the off-chain type when the size of the target data is greater than or equal to a second threshold; and
   determine the recording type as one of the on-chain type and the off-chain type according to a congestion level of the blockchain when the size of target data is greater than or equal to the first threshold and less than the second threshold, the second threshold being a value greater than the first threshold.

16. The blockchain data recording device of claim 14, wherein the classifier is configured to:
   determine the recording type as the on-chain type when the size of the target data is less than a first threshold;
   determine the recording type as the off-chain type when the size of the target data is greater than or equal to a second threshold; and
   determine the record type as one of the on-chain type and the off-chain type according to at least one of items of metadata of the target data when the size of the target data is greater than or equal to the first threshold and less than the second threshold, wherein the second threshold is greater than the first threshold; and the at least one of items is other than the size of the target data.

17. The blockchain data recording device of claim 14, wherein the classifier is configured to:
   determine the recording type as the on-chain type when the size of the target data is less than a third threshold; and
   determine the recording type as the off-chain type when the size of the target data is greater than or equal to the third threshold, the third threshold being a value that is dynamically adjusted based on a congestion level of the blockchain.

18. The blockchain data recording device of claim 11, wherein the classifier is configured to:
   determine the recording type as the off-chain type when the target data is in plain text format; and
   determine the recording type as the on-chain type when the target data is other than in plain text format.

19. The blockchain data recording device of claim 11, wherein the classifier is configured to:
   determine the recording type as the off-chain type when the target data includes a secure data; and
   determine the recording type as the on-chain type when the target data is absent of a secure data.

\* \* \* \* \*